United States Patent [19]

Hoffmann et al.

[11] Patent Number: 5,352,999
[45] Date of Patent: Oct. 4, 1994

[54] ELECTROMAGNETIC RELAY AND METHOD OF ADJUSTING SAME

[75] Inventors: Wolfgang Hoffmann; André Körner, both of Lippstadt; Maik Zimmer, Erwitte, all of Fed. Rep. of Germany

[73] Assignee: Hella KG Hueck & Co., Lippstadt, Fed. Rep. of Germany

[21] Appl. No.: 160,196

[22] Filed: Dec. 2, 1993

[30] Foreign Application Priority Data

Dec. 23, 1992 [DE] Fed. Rep. of Germany ....... 4243852

[51] Int. Cl.⁵ ............................................. H01H 51/22
[52] U.S. Cl. .................................... 335/86; 335/78; 324/418
[58] Field of Search ................................ 335/78–86, 335/124, 128; 324/415, 418

[56] References Cited

U.S. PATENT DOCUMENTS 3,239,630  3/1966  Obszarny et al. .
3,295,078  12/1966  Hrynewycz .
4,870,378  9/1989  Biehl et al. ...................... 335/128
4,972,166  11/1990  Mitsch et al. .................... 335/128
5,038,126  8/1991  Becker et al. .................... 335/202
5,291,166  3/1994  Chikira ............................ 335/78

FOREIGN PATENT DOCUMENTS

2705961A1  8/1977  Fed. Rep. of Germany .
3235714A1  3/1984  Fed. Rep. of Germany .
4035586A1  6/1991  Fed. Rep. of Germany .

Primary Examiner—Lincoln Donovan
Attorney, Agent, or Firm—Griffin Butler Whisenhunt & Kurtossy

[57] ABSTRACT

An electromagnetic relay having an uncomplicated and cost-effective construction includes a switching contact spring (5) that is adjustable in a particularly uncomplicated manner for controlling actuation sensitivity. In this manner, in particular, actuation can be influenced by a value of a minimum attraction voltage.

6 Claims, 1 Drawing Sheet

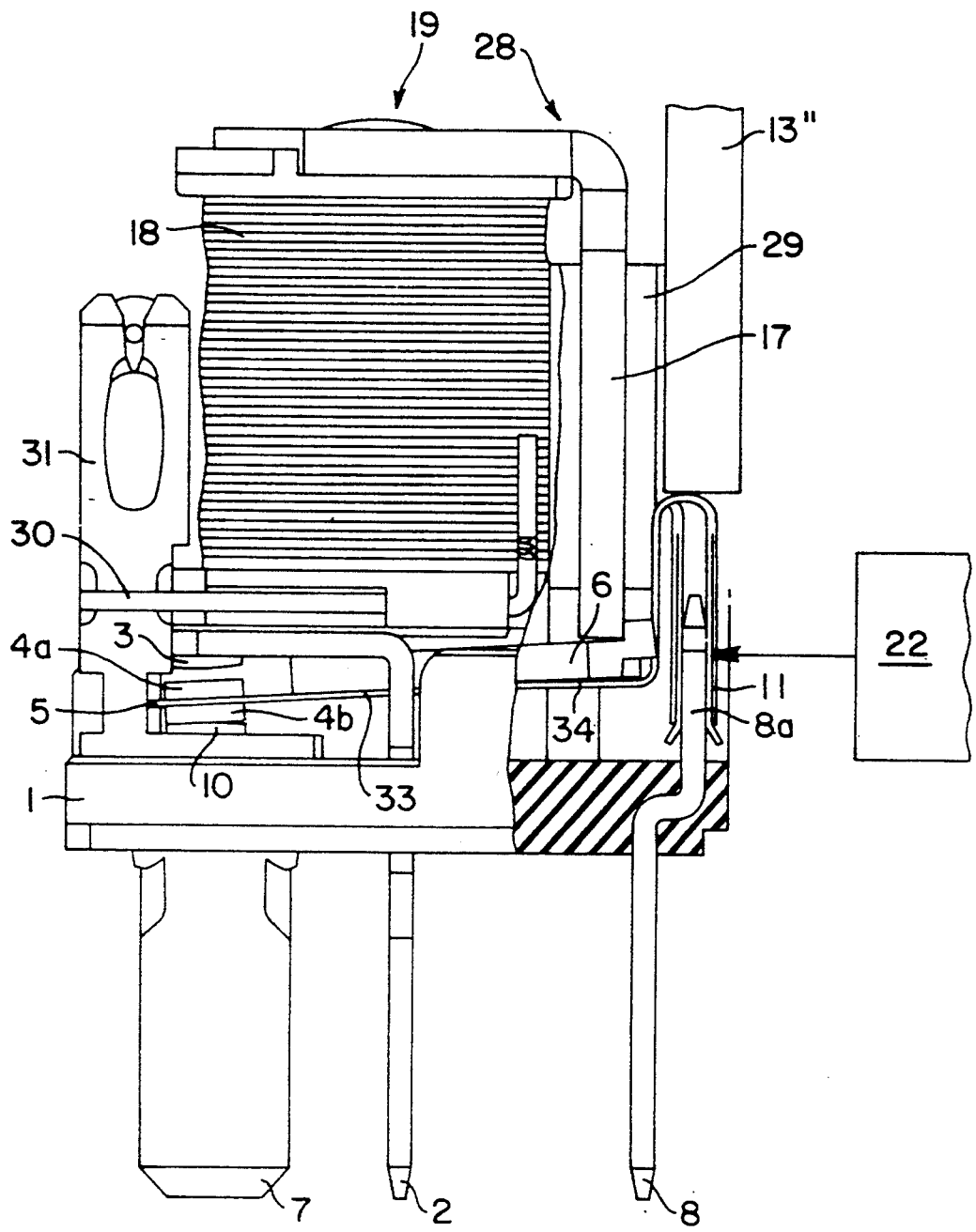
Figure

ELECTROMAGNETIC RELAY AND METHOD OF ADJUSTING SAME

BACKGROUND OF THE INVENTION

This invention concerns an electromagnetic relay having a base plate through which a plurality of terminal tongues extend, with an armature mechanically attached to a switching contact spring being arranged thereon, and with a first portion of the contact spring supporting at least one switching contact.

Modern motor vehicles, which have a multiplicity of electronic apparatus, particularly employ, among other components, microrelays. In this regard, small-size, or small-structure, relays, so called microrelays, that only require small amounts of mounting space and therefore can be particularly easily integrated into complex electronic circuits, are increasingly preferred.

Naturally, a very good operation and life span is demanded when such microrelays are employed. At the same time, manufacturing costs of such relays should, of course, remain low. Therefore, the manufacture of microrelays presents the following problems:

For large structure relays generally, manufacturing procedures are preferred which can be carried out without adjustments of combined relay components, because adjustment process steps represent substantial costs.

Particularly small microrelays require, compared to large relays, an especially exact fabrication process. The individual relay components can therefore, as is required by their size, have only very small manufacturing tolerances, so that fabrication of microrelays is relatively expensive. Experience has shown that for manufacturing microrelays it is more expedient to allow larger manufacturing tolerances for individual relay components and, because of this, upon combining the components to perform adjustments, particularly adjustments of positions of components relative to one another.

This proves to be particularly cost-effective if adjustments can be made during assembly of the relay components.

In this regard, it is necessary that a fully assembled relay be designed so that it can be mounted, or fabricated, in a particularly uncomplicated and cost-effective manner and so that, preferably, during such mounting, uncomplicated, cost-effective and fully automatic adjustments, particularly of spaces, or clearances, of relay components relative to one another are possible.

A shape as well as a position of a switching contact spring is related to adjustment of sizes, and spaces, of such a relay. The arrangement of the switching contact spring influences namely, particularly, a minimum attraction voltage of a relay (that is, the smallest voltage with which the relay reliably pulls up, or activates).

For many uses, only a very small window of tolerance of the minimum attraction voltage is allowable. Particularly relays with minimum attraction voltages which are too high are rejected or must be reworked in a cost-intensive manner, often by hand. It is therefore practical for such an arrangement, that the shape and position of a switching contact spring, to be adjustable.

In this regard, German Offenlegungsschrift DE-OS 32 35 714 discloses a process and an apparatus involving a contact spring of an electromagnetic relay which can be adjusted. To do this, targeted, or intended, points on the respective contact spring can be illuminated, or energized, by a laser beam. Local warming can cause a desired bend, and thereby accomplish a desired adjustment of a contact spring.

This applied process as well as the apparatus suggested therefor is complicated and expensive. On the one hand, a functional interrelationship between an energized area and illumination time with a resulting bending of the contact spring must be known and, on the other hand, to carry out this process, it is necessary to have an apparatus for creating a laser beam, an electro-optical apparatus to guide the laser beam, a calculator to control the electro-optical apparatus as well as an optical-measuring arrangement to measure respective changing positions of the contact spring, with the optical measuring device also being coupled to the calculator.

It is also a disadvantage that adjustment of the contact spring thereby takes place in a separate process step after the relay is assembled.

Relays of the general type of this invention are disclosed in German Offenlegungsschriften DE-OS 27 05 961 and DE-OS 40 35 586. These publications describe armature-supporting switching contact springs having functions of return springs.

U.S. Pat. No. 3,239,630 describes a relay having a coupling element between an armature-supporting switching contact spring and a terminal stud which is constructed as a spring clamping connection. This construction of the coupling element is meant to particularly prevent soldering connections on the relay.

It is disadvantageous, in this regard, that such a spring clamping connection allows undue movement. Thus, a good and, above all, lasting adjustment of the relay is not guaranteed.

It is therefore an object of this invention to provide a relay that has an uncomplicated and cost-effective construction and with which a lasting adjustment of a switching contact spring can take place in a particularly uncomplicated and cost-effective manner and indeed during mounting, or assembly, of the relay.

SUMMARY

According to principles of this invention, a switching contact spring has at a second end portion thereof, which is opposite to a first end portion thereof, a coupling element which is coupled to a portion of a contact tongue, with the coupling element simultaneously producing a sliding mechanical coupling as well as an electrical coupling with the portion of the contact tongue, the coupling element being constructed as a spring clamping apparatus. The position of the coupling element is adjusted and affixed relative to the portion of the terminal tongue during assembly of the relay while the relay is energized with a minimum attraction voltage.

BRIEF DESCRIPTION OF THE DRAWING

The invention is described and explained in more detail below using the embodiment shown in the drawing.

The described and drawn features, in other embodiments of the invention can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

The only drawing is a side elevational view, partly in cross section, of a relay according to this invention during adjustment of a switching contact spring thereof.

DETAILED DESCRIPTION OF THE DRAWING

A relay of this invention comprises a base plate 1 through which a plurality of contact, or terminal, tongues 2, 7, 8 extend. The terminal tongues 2, 7, 8 as well as further, not shown in the drawing, terminal tongues, provide electrical connections to switch contacts 3, 4a, 4b, 10 of the relay as well as serve to energize a magnetic coil 18. Some of the terminal tongues extending through the base plate 1 cannot be seen in the drawing because they are covered by the terminal tongue 7.

The contact, or terminal, tongue 2 supports at an end portion thereof the normally-open contact 3. Another terminal tongue provides an electrical connection to a normally-closed contact 10. Between the normally-open contact 3 and the normally-closed contact 10 switch contacts 4a, 4b are arranged on a switching contact spring 5.

The magnetic coil 18, together with a yoke 28 and a coil core, forms a construction unit, or component, which is the so-called yoke-rivet-group 19.

Two plates, or flanges, 29 (only one seen) are formed on the base plate 1 which have grooves aligned along their lengths. Both flanges 29 form with their grooves guides in which a portion 17 of the yoke 28, which is parallel to a core axis, is shoved. In this manner the yoke-rivet-group 19 is attached to the base plate 1. The cross-sectioned, or cut away, portion of FIG. 1 shows one of the flanges 29 with an inserted yoke portion 17.

Further, terminal leads 30 of the magnetic coil 18 are in electrical contact with terminal springs 31 which, again, are in electrically coupled with contact tongues. In the following discussion it is assumed that the yoke-rivet-group 19, upon assembly of the relay by shoving the yoke portion 17 into the grove 16, is to be adjusted relative to the rest of the relay components.

A facing, bottom, edge of the yoke portion 17 presses on an armature 6 in the yoke's desired position. Further, the armature 6 is held by means of the switching contact spring 5 to which it is attached, the switching contact spring having a coupling element 11 at its end portion 34 which is seated on a portion 8a of the terminal tongue 8.

The coupling element 11 is thereby formed as a clamping apparatus which has three functions: firstly, it serves to mechanically attach the switching contact spring 5 to the portion 8a of the terminal tongue 8; secondly, it produces an electrical coupling between the switching contact spring 5 and the terminal tongue 8; and thirdly, it makes possible a sliding of the switching contact spring 5 on the portion 8a of the terminal tongue 8 and thereby allows an adjustment of the switching contact spring 5.

This adjustment of the switching contact spring 5 can take place in an uncomplicated manner with an adjusting stamp 13", which shoves, or slides, the coupling element 11 relative to the portion 8a of the terminal tongue 8. Because a minimum attraction, voltage is an important parameter for adjustment, this voltage is applied to the terminal electrode 30 of the magnetic coil 18. Finally, the coupling element 11 is shoved (or pulled) (slid) by the adjusting stamp 13" until the armature 6 is attracted (pulled to it) by the magnetic coil 18. The pull or attraction of the relay can be easily monitored in this regard because, an electrical connection between the switch contact 4a and the normally-open contact 3, and thereby also between the terminal tongues 2 and 8 which are coupled to these contacts, is produced.

When with the afore-provided minimum attraction voltage the relay attracts, or pulls up, the coupling element 11 is affixed on the portion 8a of the contact tongue 8. This can take place in a particularly uncomplicated, fast and cost-effect manner by means of material deformation, or fusion, caused by a laser welding apparatus.

The coupling element 11, which is first slidingly placed on the terminal tongue 8, allows thereby a particularly uncomplicated and cost-effective adjustment of the switching contact spring 5. It is particularly beneficial that the adjustment of the relay takes place during application of a minimum attraction voltage as an adjustment parameter. Because the relay, during this adjustment, must be actuated at least once, an adherence to a minimum attraction voltage in the relay of this invention is guaranteed. Because in this manner, each relay is simultaneously tested during assembly and adjustment, a rejection rate of relays of the type of this invention due to intolerable deviations from minimum attraction voltages is zero.

A relay according to this invention can, because of its construction, be particularly efficiently adjusted. That is, by allowing sliding contact movement between the spring clamping mechanism and the portion of the contact terminal tongue in a direction for properly adjusting sensitivity of actuation of the armature, and thereby of the movable switch contact, an electromagnetic relay of this invention allows a "fine-tuning" of the relay actuation during its assembly. It is particularly beneficial that once a relay of this invention has been adjusted a coupling element permanently affixes the coupling element to the terminal tongue so that relay adjustment is durably maintained.

Upon assembly of a relay according to this invention, the coupling element, in a first mounting step, is placed on a portion of the terminal tongue. Thereby it is particularly beneficial that the coupling element is formed as a spring-like clamping apparatus so that the switching contact spring is reliably and simultaneous slidably connected with the portion of the terminal tongue. In a second mounting step the coupling element is shoved by an adjusting stamp whereby the coupling element, upon reaching its desired position on the portion of the contact tongue, is preferably affixed thereto by a welding process. The adjustment of the switching contact spring thereby results during its mounting. A follow-up adjustment step is not necessary.

The portion of an automatic-assembly apparatus which assembles the coupling element with the contact tongue can thereby efficiently, simultaneously be formed as an adjusting stamp.

The invention in which an exclusive property or privilege is claimed is defined as follows:

1. An unadjusted, and therefore unfinished, electromagnetic relay comprising:
   a base plate;
   a plurality of terminal tongues extending through and engaging said base plate;

an armature;

a switching contact spring mechanically attached to the armature for supporting the armature with a first portion of the switching contact spring having at least one movable switch contact thereon;

wherein a second portion of the switching contact spring has a coupling element coupled to a portion of a contact terminal tongue, said coupling element providing a mechanical as well as an electrical connection with said portion of said contact terminal tongue, said coupling element being formed as a spring clamping mechanism for allowing sliding contact between said spring clamping mechanism and said contact terminal tongue for allowing sliding contact between said spring clamping mechanism and said portion of said contact terminal tongue in a direction for properly adjusting a sensitivity of movement of said movable switch contact, said coupling element including a means for affixing it to the portion of the terminal tongue at a correctly adjusted position.

2. An electromagnetic relay as in claim 1 wherein said means for affixing is deformed material produced by a welding process.

3. An electromagnetic relay as in claim 2 wherein said means for affixing is deformed material produced by a laser welding process.

4. A process for the adjustment of components of a relay of a type having a base plate with a plurality of terminal tongues extending therethrough, with a normally-open contact tongue thereof supporting a normally-open contact and having a substantially L-shaped bend therein, a switching contact spring including a switch contact and an armature attached thereto, and a magnetic system comprising a magnetic coil, a coil core, and a yoke, said process involving adjustment of the position of the switching contact spring and including the steps of:

providing a coupling element that is coupled to the switching contact spring;

slidably placing the coupling element on a portion of one of the terminal tongues;

placing a characteristic attraction voltage on the magnetic coil of the relay;

monitoring movement of the armature relative to the coil with a measuring device;

shoving the coupling element along the portion of the one of the terminal tongues until there is a predetermined movement of the armature relative to the coil; and issuing a signal from said measuring device in response to its detecting the predetermined movement of the armature relative to the coil to a welding apparatus which, in response thereto, welds the switching contact spring in its present position to the portion of the terminal tongue.

5. A process as in claim 4 wherein the measuring device is in circuit between two terminal tongues which monitors if an electrical connection exists between the normally-open contact and the switch contact.

6. A process as in claim 4 wherein the welding of the coupling element to the portion of the terminal tongue is done with a laser welding apparatus.

* * * * *